United States Patent
Hernacki et al.

(10) Patent No.: US 7,904,940 B1
(45) Date of Patent: Mar. 8, 2011

(54) AUTOMATED ENVIRONMENTAL POLICY AWARENESS

(75) Inventors: Brian Hernacki, San Carlos, CA (US); Jeremy Bennett, Mountain View, CA (US)

(73) Assignee: Symantec Corporation, Mountain View, CA (US)

(*) Notice: Subject to any disclaimer, the term of this patent is extended or adjusted under 35 U.S.C. 154(b) by 1188 days.

(21) Appl. No.: 10/987,438

(22) Filed: Nov. 12, 2004

(51) Int. Cl.
*G06F 17/00* (2006.01)

(52) U.S. Cl. ............ 726/1; 726/2; 726/11; 726/14; 713/100; 713/152; 709/224

(58) Field of Classification Search ............ 726/1, 2, 726/11, 13, 26, 14, 23; 709/229, 223–225; 713/100, 152, 166
See application file for complete search history.

(56) References Cited

U.S. PATENT DOCUMENTS

| | | | | |
|---|---|---|---|---|
| 5,751,967 A * | 5/1998 | Raab et al. | | 709/228 |
| 6,202,157 B1 * | 3/2001 | Brownlie et al. | | 726/1 |
| 6,212,558 B1 * | 4/2001 | Antur et al. | | 709/221 |
| 6,377,810 B1 | 4/2002 | Geiger et al. | | |
| 6,499,110 B1 * | 12/2002 | Moses et al. | | 726/1 |
| 6,530,024 B1 * | 3/2003 | Proctor | | 726/23 |
| 6,611,863 B1 * | 8/2003 | Banginwar | | 709/220 |
| 6,789,202 B1 * | 9/2004 | Ko et al. | | 726/23 |
| 6,920,558 B2 * | 7/2005 | Sames et al. | | 713/166 |
| 6,990,591 B1 * | 1/2006 | Pearson | | 726/22 |
| 7,159,125 B2 * | 1/2007 | Beadles et al. | | 713/193 |
| 7,231,665 B1 * | 6/2007 | McArdle et al. | | 726/22 |
| 7,249,187 B2 * | 7/2007 | Sobel et al. | | 709/229 |
| 7,284,267 B1 * | 10/2007 | McArdle et al. | | 726/11 |
| 7,337,471 B2 * | 2/2008 | Nachenberg et al. | | 726/23 |
| 7,353,533 B2 * | 4/2008 | Wright et al. | | 726/1 |
| 7,448,067 B2 * | 11/2008 | Yadav | | 726/1 |
| 7,490,142 B2 * | 2/2009 | Kumar et al. | | 709/222 |
| 7,644,151 B2 * | 1/2010 | Jerrim et al. | | 709/224 |
| 7,805,752 B2 * | 9/2010 | Newstadt et al. | | 726/1 |
| 2002/0099503 A1 * | 7/2002 | Mishra et al. | | 701/213 |
| 2003/0097590 A1 * | 5/2003 | Syvanne | | 713/201 |
| 2003/0167405 A1 * | 9/2003 | Freund et al. | | 713/201 |
| 2004/0083382 A1 * | 4/2004 | Markham et al. | | 713/200 |
| 2004/0083386 A1 * | 4/2004 | Marquet et al. | | 713/201 |
| 2004/0151135 A1 * | 8/2004 | Kitahama et al. | | 370/328 |
| 2004/0193711 A1 * | 9/2004 | Marilly et al. | | 709/224 |
| 2005/0102512 A1 * | 5/2005 | Goh et al. | | 713/168 |
| 2005/0108568 A1 * | 5/2005 | Bussiere et al. | | 713/201 |
| 2005/0138061 A1 * | 6/2005 | Kuehr-McLaren et al. | | 707/102 |
| 2006/0059551 A1 * | 3/2006 | Borella | | 726/13 |
| 2006/0095961 A1 * | 5/2006 | Govindarajan et al. | | 726/15 |

OTHER PUBLICATIONS

Susan Hinrichs, Policy-Based Management: Bridging the Gap, pp. 1-11, Computer Security Application Conference, 1999.*

* cited by examiner

*Primary Examiner* — Nasser Moazzami
*Assistant Examiner* — Shanto M Abedin
(74) *Attorney, Agent, or Firm* — Hunton & Williams LLP

(57) ABSTRACT

Configuring a device operating in a network environment comprises receiving a network policy from a policy authority, classifying the network policy based on the identity of the policy authority, determining a local policy according to the classification, and determining a device configuration change to comply with the network policy in accordance with the local policy. Configuring a device joining a network environment includes detecting that a device has joined the network environment, sending a network policy from a policy authority to the device, the network policy including authentication information for the policy authority, and notifying the presence of the device to a policy monitor.

33 Claims, 5 Drawing Sheets

| Network Policy | Local Policy | Existing Configurations | Resulting Configurations |
|---|---|---|---|
| Volume = 0 | Volume Reset Allowed = Yes | Volume = 12 | Volume = 0 |
| Brightness = Low | Brightness Reset Allowed = Yes<br>Brightness >= Medium | Brightness = High | Brightness = Medium |
| Antivirus = On | Antivirus Allowed = Yes | Antivirus = Off | Antivirus = On |
| Firewall = On | Firewall Allowed = Yes | Firewall = On | Firewall = On |
| Ports Blocked by Firewall = 135, 137, 139, 445 | Port Blocking Allowed = Yes | Ports Blocked by Firewall = 17, 29 | Ports Blocked by Firewall = 17, 29, 135, 137, 139, 445 |
| Protocols Accepted = DHCP, HTTP | Protocols Acceptance Allowed = Yes | Protocols Accepted = Ping | Protocols Accepted = DHCP, HTTP, Ping |
| ... | ... | ... | ... |

The Following Configuration Changes are Requested by the System. Click on "OK" to Accept the Changes. If you do not Want a Change to Occur, Uncheck the Box Next to the Item Before Clicking "OK".

- ☐ Volume = 0
- ☑ Brightness = Medium
- ☑ Antivirus = On
- ☐ Additional Ports Blocked by Firewall
    - ☐ 135
    - ☑ 137
    - ☑ 139
    - ☑ 445
- ☑ Additional Protocols Accepted
    - ☑ DHCP
    - ☑ HTTP

AUTOMATED ENVIRONMENTAL POLICY AWARENESS

FIELD OF THE INVENTION

The present invention relates generally to network environments. More specifically, network policy configuration is disclosed.

BACKGROUND OF THE INVENTION

In traditional networking environments, devices are typically configured statically. Since most devices join or leave the network infrequently, the configuration of devices is usually done manually or by invoking a script on the device. As mobile devices become more popular and networks become more dynamic, it is often impractical to statically configure policies for devices that may be roaming among different networks. For example, a laptop computer may be required to have one set of security policies when it is connected to a corporate local area network, a different set of security policies when connected to an ad hoc public wireless hot spot, and yet another set of security policies when connected to the home network. Furthermore, because devices may join and leave network environments at random, it has become more difficult to enforce network policies. It would be desirable if a device could be more aware of its environment and more easily configured when moving between environments with different policy requirements. It would also be useful if policy compliance could be more effectively enforced.

BRIEF DESCRIPTION OF THE DRAWINGS

Various embodiments of the invention are disclosed in the following detailed description and the accompanying drawings.

FIG. 4A is a table illustrating the merging of a network policy and a local policy according to some embodiments.

FIG. 4B is a diagram illustrating a user interface that provides configuration change feedback according to some embodiments.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A policy based device configuration is disclosed. A policy may include settings, requirements, recommendations, rules, etc. related to the configurations of devices on the network. A policy that is applicable to devices in a particular network environment (also referred to as a zone or a region, examples including an office, a laboratory, a coffee house, a subnet, a wireless hot spot, etc.) is referred to as a network policy. In some embodiments, a network policy is received from a policy authority and classified. The classification may be based on the identity of the policy authority, the trust level of the policy authority, or any other appropriate criteria. The configurations of the device are adjusted to comply with the network policy in accordance with a local policy that is determined according to the classification.

Figure 1:
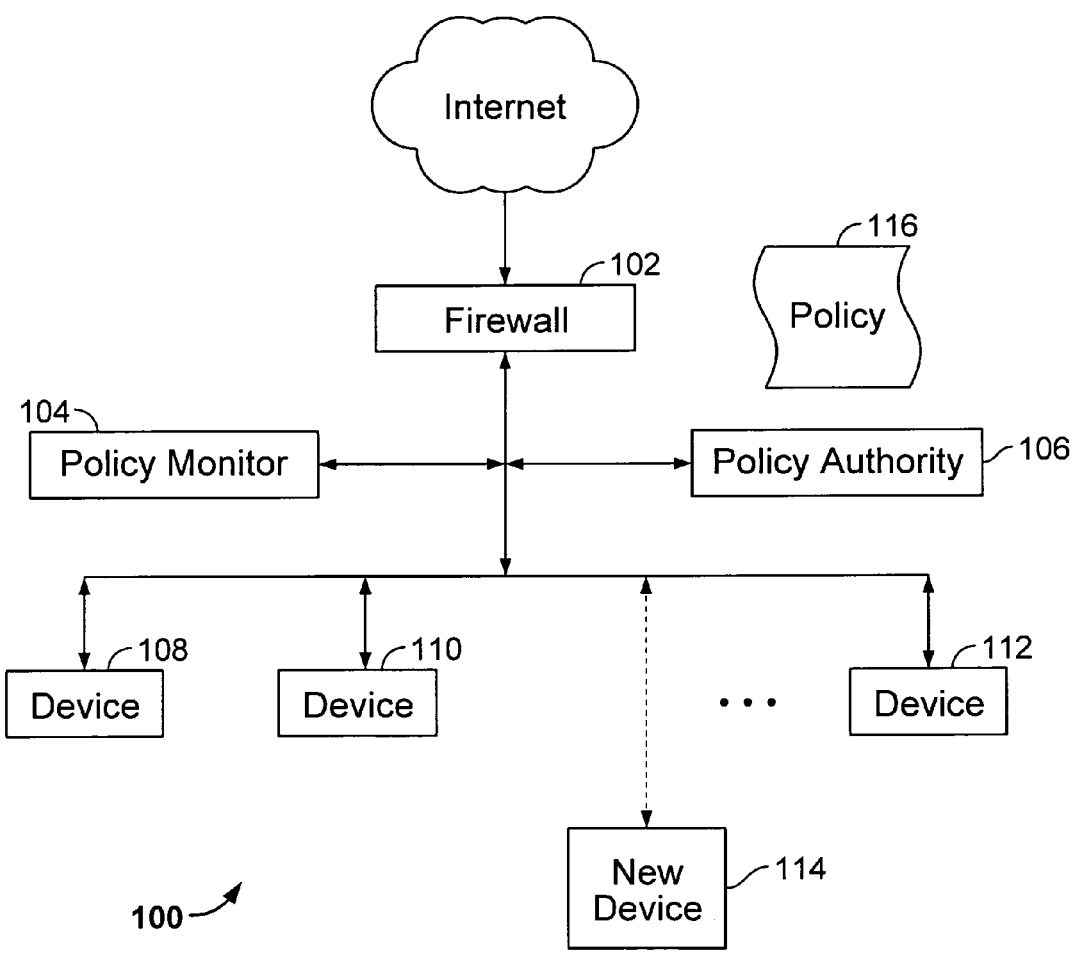
FIG. 1 is a diagram illustrating a network configuration according to one embodiment.

FIG. 1 is a diagram illustrating a network configuration according to one embodiment. In this example, network 100 is protected by firewall 102. A policy authority 106 sends network policy 116 to devices such as 108-112 on the network. The network policy may be broadcast periodically or sent to devices upon request.

In some embodiments, devices on the network adjust their configurations to comply with the network policy. In some example networks, if the network policy requires the devices to have a minimal level of security setting, then all devices on the network are required to at least meet the minimal level, although they are permitted to have a higher level of security that will provide better protection. If a new device such as device 114 joins the network, it may wait for a periodic network broadcast by policy authority 106 or send a policy request to the policy authority. In some embodiments, policy authority 106 optionally collaborates with policy monitor 104, which is configured to monitor and enforce the network policy. The policy monitor may test devices on the network to ensure that they have met the network policy requirements. If a device does not comply with the network policy, policy monitor 104 (or another device that is appropriately authorized) may take certain actions such as blocking the non-compliant device from accessing the network.

Figure 2:
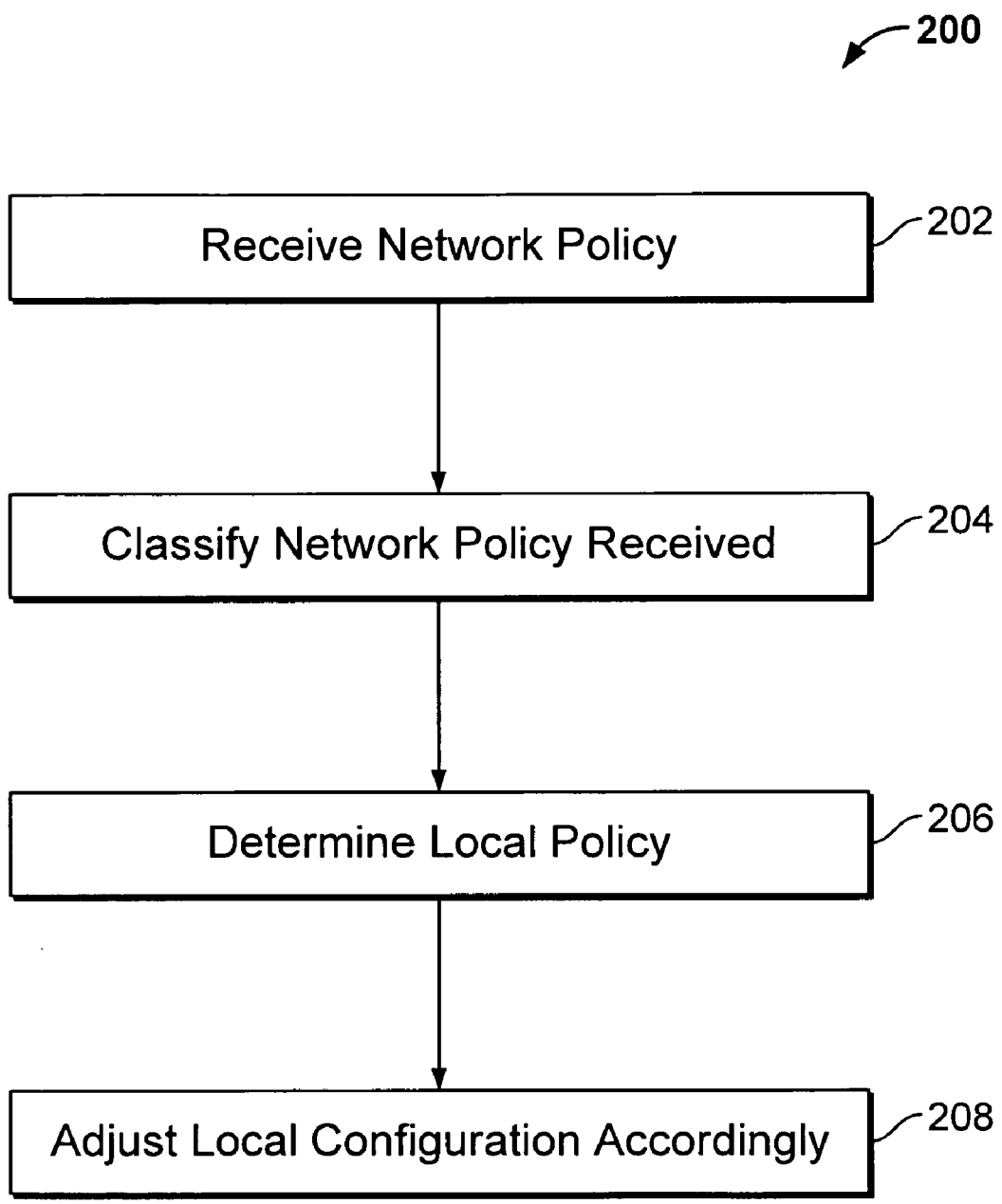
FIG. 2 is a flowchart illustrating policy processing by a network device, according to some embodiments.

FIG. 2 is a flowchart illustrating policy processing by a network device, according to some embodiments. In this example, process 200 is performed by an agent residing on the network device. The agent enables the device to cooperate with the policy authority, and to optionally cooperate with the policy monitor. An agent may be implemented as software or firmware, embedded in a processor, integrated circuit or any other appropriate devices or combinations thereof. In this example, once a network policy is received (202), the network policy is classified based on the identity of the policy authority (204). A local policy is then determined according to the classification (206). The configuration of the device is then adjusted to comply with the network policy in accordance with the local policy (208). Details of the adjustment are described below.

As used herein, local policies are predefined policies associated with various network environments. The local policies may be configured by the user or obtained from a trusted source. For example, the local policy associated with a conference center may set a mobile device to have a silent ring, and the local policy associated with a secure network may require the device to have updated virus definitions. In some embodiments, the local policies may be formulated based on the types of environment. For example, a laptop owner may use the laptop in network environments that require high security level (e.g., the corporate office), medium security level (e.g., the home network) and low security level (e.g., the local coffee shop). Three sets of local policies corresponding to different security levels may be predefined to suit the needs of these disparate environments. In some embodiments, different local policies exist for policy authorities that have different trust levels. For example, a local policy that corresponds to a trusted policy authority may allow a device to reset all of its configurations according to the network policy received from the policy authority, while another local policy that corresponds to an unknown policy authority may only allow the device to reset some of the configurations according to the network policy. The local policies may be stored in the devices' local storage space or be otherwise easily accessible to the devices.

Figure 3:
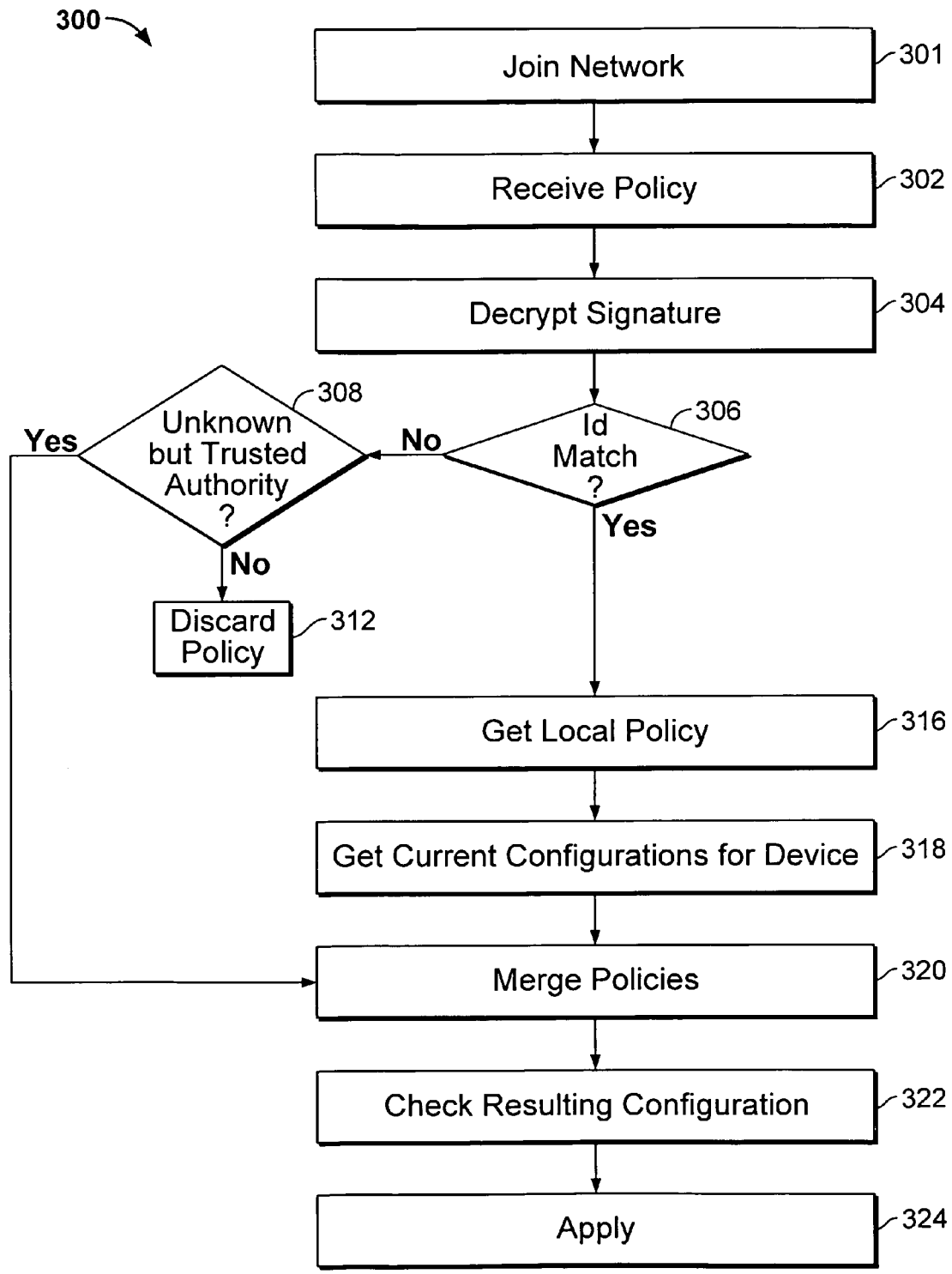
FIG. 3 is a flowchart illustrating the processing of a policy according to another embodiment.

FIG. 3 is a flowchart illustrating the processing of a policy according to another embodiment. In this example, the policy is classified based on a trust level associated with the policy authority. Authentication information such as a cryptographic signature included in the network policy can be used to establish the trust level. In some embodiments, the authentication information includes an identifier of the policy authority (which may include a name, a key phrase, an alpha-numeric sequence or any other appropriate value that can be used to identify the policy authority) and a digital signature with the identifier encrypted using a private key assigned to the policy authority.

In this example, process 300 initiates when a device joins the network (301). The device may wait for a policy to be broadcasted or request a network policy from the policy authority. In some embodiments, the policy authority cooperates with a dynamic host configuration protocol (DHCP) server to automatically send policy upon an address request by the device. Once a network policy is received (302), the digital signature is decrypted using a public key associated with the policy authority and available to the device to obtain an identifier for the policy authority. In some embodiments, the device keeps a list of known, trusted policy authorities.

The identifier obtained from decryption is compared with the list to determine whether there is a match (306). If the identifier does not match any of the known policy authorities, it is further determined whether the signature comes from a trusted source (308). In this case, the policy authority is deemed trusted when the identifier obtained from decryption matches the unencrypted identifier that is also included in the policy. The policy is selectively applied in accordance with the local policy by merging with a default local policy that is associated with policies from unknown but trusted policy authority (320). After the validity of the merged configuration is checked (322), the merged policy is applied to the device (324). If the policy authority is distrusted (i.e. the identifier obtained by decrypting the signature does not match the unencrypted identifier also supplied by the policy authority, thus indicating that the signature is invalid), the policy is discarded (312).

If the identifier is found to match a known and trusted policy authority, a local policy that corresponds to the environment associated with the policy authority is retrieved (316). The current configurations for the device are obtained (318). The current configurations and the network policy are merged in accordance with the local policy (320); the details of which are discussed below. The resulting configurations are optionally checked to insure their validity (322). The checking may be implemented in many ways. For example, the resulting configuration may be presented to the owner of the system for confirmation. The owner can review and optionally make changes to the configuration. The resulting configuration may also be checked automatically by the agent. The finalized configuration that is deemed acceptable is then applied to the device (324).

FIG. 4A is a table illustrating the merging of a network policy and a local policy according to some embodiments. In this example, the first and second columns of the table show configurations of a network policy and a corresponding local policy, respectively, in plain text name-value pair format. The third column shows several existing configurations on the device. The resulting configurations from merging the network policy and local policy are shown in the fourth column.

The device configuration is adjusted to comply with the network policy in accordance with the local policy. For example, the current volume setting is shown to be 12; however, the network policy requires that the system volume to be set to zero. Since the local policy allows volume reset, the resulting volume configuration to be applied to the device is set to zero. In contrast, although the system requires that brightness of the device's display to be set to low, the local policy requires that brightness to remain at least at medium level. As such, the resulting brightness configuration sets the brightness to medium. Similarly, although the existing configuration has its anti-virus software turned off, because the network policy requires the device's anti-virus software to be turned on and the requirement is allowed by the local policy, the resulting configuration has anti-virus turned on.

Also shown in the example are configurations of ports blocked by firewall and protocols accepted by firewall. In both cases, the resulting configuration is a union of the network policy and existing configuration. In some embodiments, the merging process may adhere to a default rule that prevents the resulting merged configuration to have less strict security requirements than the existing configuration.

FIG. 4B is a diagram illustrating a user interface that provides configuration change feedback according to some embodiments. In this example, configuration changes resulting from the policy merging are displayed to the user and the user is prompted to accept the changes. User interface options are provided as check boxes placed next to the configuration changes. By selecting or deselecting the options, the user may choose to apply some of the configuration changes but not others. In the example shown, the user has chosen not to change the volume setting or block port 135. There are many other possible ways to provide feedback. In some embodiments, the identity of the policy authority, the reasons for the changes, as well as other pertinent information, are presented to the user. In some embodiments, the changes are directly applied without soliciting user input, and a notification such as a dialog box, an electronic message or a log entry may be presented to the user after the configurations have been applied.

Figure 5:
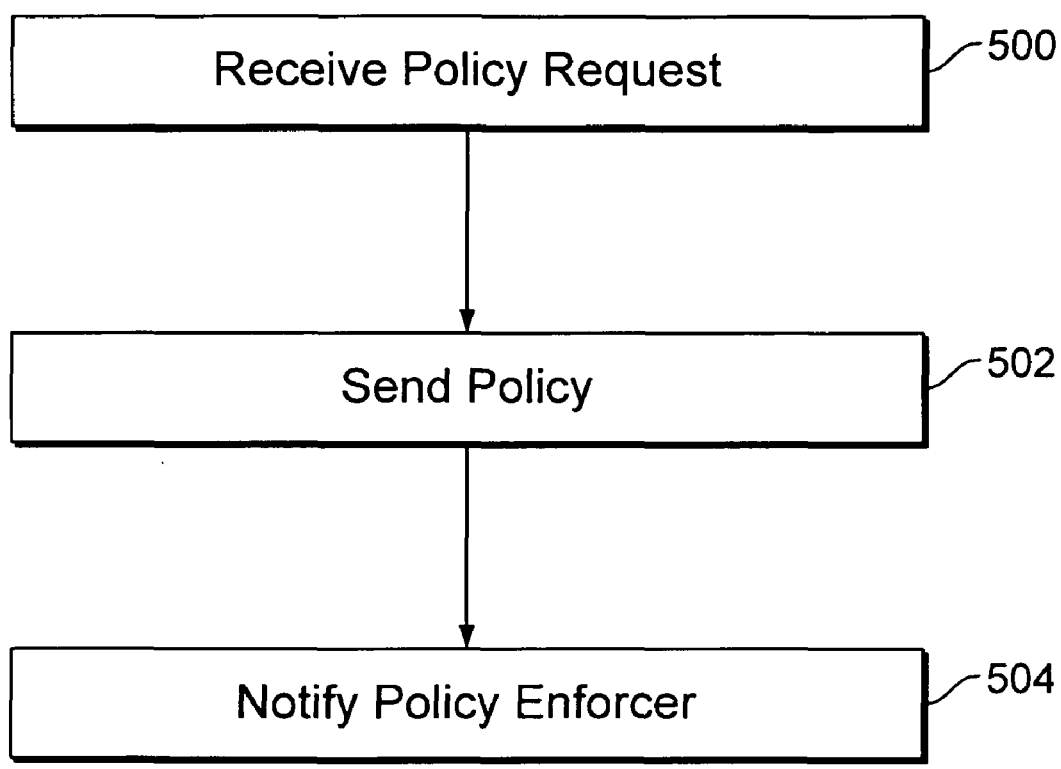
FIG. 5 is a flowchart illustrating the operations of the policy authority according to some embodiments.

FIG. 5 is a flowchart illustrating the operations of the policy authority according to some embodiments. In this example, the policy authority receives a policy request from a device (500) and sends a network policy to the device (502). The policy authority may send the policy as soon as the request is received or at a pre-determined time when a regular policy update is scheduled to take place. A policy enforcer on the network is optionally notified of the presence of a new device on the network (504) so that policy audits can be performed to ensure compliance.

Policy configuration has been described. Using the techniques described above, devices can be more easily configured when moving between network environments with different policy requirements. Policy compliance can also be enforced more effectively. The techniques described herein are applicable to wired networks, wireless networks or mixed networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of configuring a device operating in a network environment, comprising:
   receiving a network policy from a policy authority that is an entity other than the device, and that is configured to send one or more network policies to one or more devices operating in the network environment, wherein the network environment is one of a plurality of network environments in which the device is configured to operate;
   classifying the network policy based on a trust level of the policy authority, wherein the trust level of the policy authority is established by decrypting a digital signature associated with the network policy using a public key to obtain an identifier associated with the policy authority and comparing the identifier to a list of known policy authorities, and wherein the classification is one of a plurality of classifications each associated with a corresponding one of the plurality of network environments;
   determining a local policy according to the classification, wherein the local policy is one of a plurality of local policies, each local policy in the plurality corresponding to an associated one of the plurality of network environments; and
   determining a device configuration change to comply with the network policy in accordance with the local policy by merging the received network policy with the determined local policy.

2. The method as recited in claim 1, wherein classifying the network policy includes determining an identity of the policy authority.

3. The method as recited in claim 1, wherein classifying the network policy includes determining that the policy authority is a trusted and known policy authority.

4. The method as recited in claim 1, wherein classifying the network policy includes determining that the policy authority is a trusted and unknown policy authority.

5. The method as recited in claim 1, wherein classifying the network policy includes determining that the policy authority is a distrusted policy authority.

6. The method as recited in claim 1, wherein the network policy includes authentication information.

7. The method as recited in claim 1, wherein the network policy includes a cryptographic signature.

8. The method as recited in claim 1, wherein classifying the network policy includes determining the trust level associated with the policy authority, and the local policy is determined based on the trust level.

9. The method as recited in claim 1, wherein the local policy is associated with the network environment.

10. The method as recited in claim 1, further comprising providing feedback about the device configuration change to a user.

11. The method as recited in claim 1, wherein the device configuration change is adjustable by a user.

12. A device operating in a network, comprising:
   at least one processor configured to:
      receive a network policy from a policy authority that is an entity other than the device, and that is configured to send one or more network policies to one or more devices operating in the network environment, wherein the network environment is one of a plurality of network environments in which the device is configured to operate;
      classify the network policy based on a trust level of the policy authority, wherein the trust level of the policy authority is established by decrypting a digital signature associated with the network policy using a public key to obtain an identifier associated with the policy authority and comparing the identifier to a list of known policy authorities, and wherein the classification is one of a plurality of classifications each associated with a corresponding one of the plurality of network environments;
      determine a local policy according to the classification, wherein the local policy is one of a plurality of local policies, each local policy in the plurality corresponding to an associated one of the plurality of network environments; and
      determine a device configuration change to comply with the network policy in accordance with the local policy by merging the received network policy with the determined local policy; and
   a memory coupled to the at least one processor, configured to provide the at least one processor with instructions.

13. The device as recited in claim 12, wherein classifying the network policy includes determining an identity of the policy authority.

14. The device as recited in claim 12, wherein classifying the network policy includes determining that the policy authority is a trusted and known policy authority.

15. The device as recited in claim 12, wherein classifying the network policy includes determining that the policy authority is a trusted and unknown policy authority.

16. The device as recited in claim 12, wherein classifying the network policy includes determining that the policy authority is a distrusted policy authority.

17. The device as recited in claim 12, wherein the network policy includes authentication information.

18. The device as recited in claim 12, wherein the network policy includes a cryptographic signature.

19. The device as recited in claim 12, wherein classifying the network policy includes determining the trust level associated with the policy authority, and the local policy is determined based on the trust level.

20. The device as recited in claim 12, wherein the local policy is associated with the network environment.

21. The device as recited in claim 12, wherein the processor is further configured to provide feedback about the device configuration change to a user.

22. The device as recited in claim 12, wherein the processor is further configured to allow a user to adjust the device configuration change.

23. A non-transitory computer readable storage medium that stores a computer program product for configuring a device operating in a network environment, the computer program product comprising computer instructions for:

receiving a network policy from a policy authority that is an entity other than the device, and that is configured to send one or more network policies to one or more devices operating in the network environment, wherein the network environment is one of a plurality of network environments in which the device is configured to operate;

classifying the network policy based on a trust level of the policy authority, wherein the trust level of the policy authority is established by decrypting a digital signature associated with the network policy using a public key to obtain an identifier associated with the policy authority and comparing the identifier to a list of known policy authorities, and wherein the classification is one of a plurality of classifications each associated with a corresponding one of the plurality of network environments;

determining a local policy according to the classification, wherein the local policy is one of a plurality of local policies, each local policy in the plurality corresponding to an associated one of the plurality of network environments;

determining a device configuration change to comply with the network policy in accordance with the local policy by merging the received network policy with the determined local policy.

24. The non-transitory computer readable storage medium as recited in claim 23, wherein classifying the network policy includes determining an identity of the policy authority.

25. The non-transitory computer readable storage medium as recited in claim 23, wherein classifying the network policy includes determining that the policy authority is a trusted and known policy authority.

26. The non-transitory computer readable storage medium as recited in claim 23, wherein classifying the network policy includes determining that the policy authority is a trusted and unknown policy authority.

27. The non-transitory computer readable storage medium as recited in claim 23, wherein classifying the network policy includes determining that the policy authority is a distrusted policy authority.

28. The non-transitory computer readable storage medium as recited in claim 23, wherein the network policy includes authentication information.

29. The non-transitory computer readable storage medium as recited in claim 23, wherein the network policy includes a cryptographic signature.

30. The non-transitory computer readable storage medium as recited in claim 23, wherein classifying the network policy includes determining the trust level associated with the policy authority, and the local policy is determined based on the trust level.

31. The non-transitory computer readable storage medium as recited in claim 23, wherein the local policy is associated with the network environment.

32. The non-transitory computer readable storage medium as recited in claim 23, further comprising providing feedback about the device configuration change to a user.

33. The non-transitory computer readable storage medium as recited in claim 23, wherein the device configuration change is adjustable by a user.

* * * * *